United States Patent [19]

Johnson

[11] Patent Number: 4,909,046
[45] Date of Patent: Mar. 20, 1990

[54] MODULAR AUTOMOTIVE AIR CONDITIONING SYSTEM AND METHOD

[75] Inventor: Roger L. Johnson, Fort Wayne, Ind.

[73] Assignee: Navistar International Transportation Corp., Chicago, Ill.

[21] Appl. No.: 144,456

[22] Filed: Jan. 15, 1988

[51] Int. Cl.$^4$ .............................................. F25B 27/00
[52] U.S. Cl. ...................................... 62/244; 62/323.1
[58] Field of Search ...................... 62/244, 323.1, 298; 165/42, 43; 123/41, 49

[56] References Cited

U.S. PATENT DOCUMENTS

| | | | |
|---|---|---|---|
| 2,017,579 | 10/1935 | Anderson | 165/43 |
| 2,129,846 | 9/1938 | Knochenhauer | 123/41.49 X |
| 2,263,476 | 11/1941 | Sunclay | 62/323.1 X |
| 2,760,347 | 8/1956 | Dolza | 62/298 X |
| 2,799,143 | 7/1957 | Weigel | 62/323.1 X |
| 4,217,764 | 8/1980 | Armbruster | 62/323.1 |
| 4,320,628 | 3/1982 | Okajima | 62/244 X |
| 4,351,162 | 9/1982 | Yei | 62/244 X |

Primary Examiner—William E. Tapolcai
Attorney, Agent, or Firm—F. David Aubuchon; Dennis K. Sullivan

[57] ABSTRACT

A modular automotive air conditioning system has all of the refrigerant loop components, i.e., compressor, condenser, receiver-drier, and evaporator, mounted on the engine as discrete components to form a unit which can be tested, and repaired if necessary, prior to installation of the engine and refrigerant loop together in the vehicle. The vehicle radiator is also mounted on the engine to facilitate the condenser mounting. In the vehicle, the evaporator is connected to the dash-mounted vehicle heater and blower with a flexible duct to accommodate relative motion between the engine-mounted evaporator and the heater.

5 Claims, 1 Drawing Sheet

MODULAR AUTOMOTIVE AIR CONDITIONING SYSTEM AND METHOD

This invention relates to a vehicle air conditioning system and, more particularly, to a modular automotive air conditioning system having all the refrigerant handling components connected to the engine prior to assembly on the vehicle for testing and subsequent installation of the engine and the components as a unit.

BACKGROUND OF THE INVENTION

Conventional air conditioning systems for motor vehicles are installed by individually mounting the components of the system on the vehicle. When the installation is complete, the system is checked for leakage of air into the refrigerant system, then charged with the refrigerant, and rechecked for leakage. Performance of the system is then checked to see that the air conditioning system operates normally. If the system is not functioning properly or is leaking, the vehicle is sent to a repair station to correct the problem after vehicle assembly. This is inconvenient and time consuming in the overall assembly process.

Assembly and functional testing of the air conditioning system can be done far more easily off the vehicle assembly line in a test cell or on the engine trim line prior to installation in the vehicle. Accordingly, the present invention provides for installing all the refrigerant handling components of the air conditioning system on the engine off the vehicle assembly line and testing the air conditioning system for performance in a test cell or on an engine trim line so that when the engine is installed with the system on the vehicle, the system is functioning properly so that the vehicle assembly line is not held up.

THE PRIOR ART

U.S. Pat. No. 4,570,450, Takemi, et al., Apparatus for Controlling Automotive Air Conditioners, shows an air conditioning unit in an automobile. The patent is directed to electronic controls for selective operation of the air conditioner to first and second evaporators and conduits for the air conditioned air. The present invention, however, is believed to be distinguishable on the basis that it is directed to the arrangement of the components and the installation of the evaporator and condenser on the engine so that the whole system operates as a unit with the engine. The present system is a modular system adapted for use on an automotive vehicle which can be performance-checked before its installation in the vehicle to avoid delay in the assembly line.

SUMMARY OF THE INVENTION

It is an object of this invention to provide a modular automotive air conditioning system with the components of the system mounted on the vehicle engine.

It is another object of this invention to provide a modular automotive air conditioning system with the engine supporting the components of the air conditioning system so that the engine and the air conditioning system are mounted in the vehicle on the assembly line as a unit.

It is a further object of this invention to provide a modular automotive air conditioning system with the engine providing the operating power and structurally supporting all of the components of the air conditioning system. Thus, the engine and the air conditioning system form a unit which can be performance-tested, checked for leakage and ready for operation when installed in the vehicle on the assembly line.

A further object of the invention is to provide a method of manufacturing automotive vehicles wherein all of the operating components of the air conditioning system, i.e., those components which contain the refrigerant, are installed on the engine prior to installation of the engine in the vehicle.

The objects of this invention are accomplished by mounting the components in the refrigerant loop of the air conditioning system on the engine including the compressor, condensor, evaporator, valves, and connecting tubing prior to installation of the engine in the vehicle. The compressor of the air conditioning system is preferably driven by the engine by the belt driving the accessories for the engine although electric drive of the compressor would be suitable. Preferably, the condensor is connected with the engine cooling system and both are supported by the engine. The heater for the passenger compartment and the evaporator are connected by a flexible conduit so that the blower for the heater may also be used in conjunction with the air conditioner. The engine structurally supports all the refrigerant components and may be operated as a unit with the air conditioning system before the engine and air conditioning system are mounted on the vehicle as a unit. This allows performance testing of the air conditioning system prior to installation on the vehicle and assures that the air conditioning system will be operating properly when the vehicle is assembled. It also provides the convenience of leak checking, installing refrigerant and performance-testing of the air conditioning system in a test cell or an engine trim line prior to installation on the vehicle assembly line. Alternatively, the air conditioning system may be operated without operating the engine by the use of an external power source in the test cell or engine trim line.

DESCRIPTION OF THE PREFERRED EMBODIMENT

Figure 1:
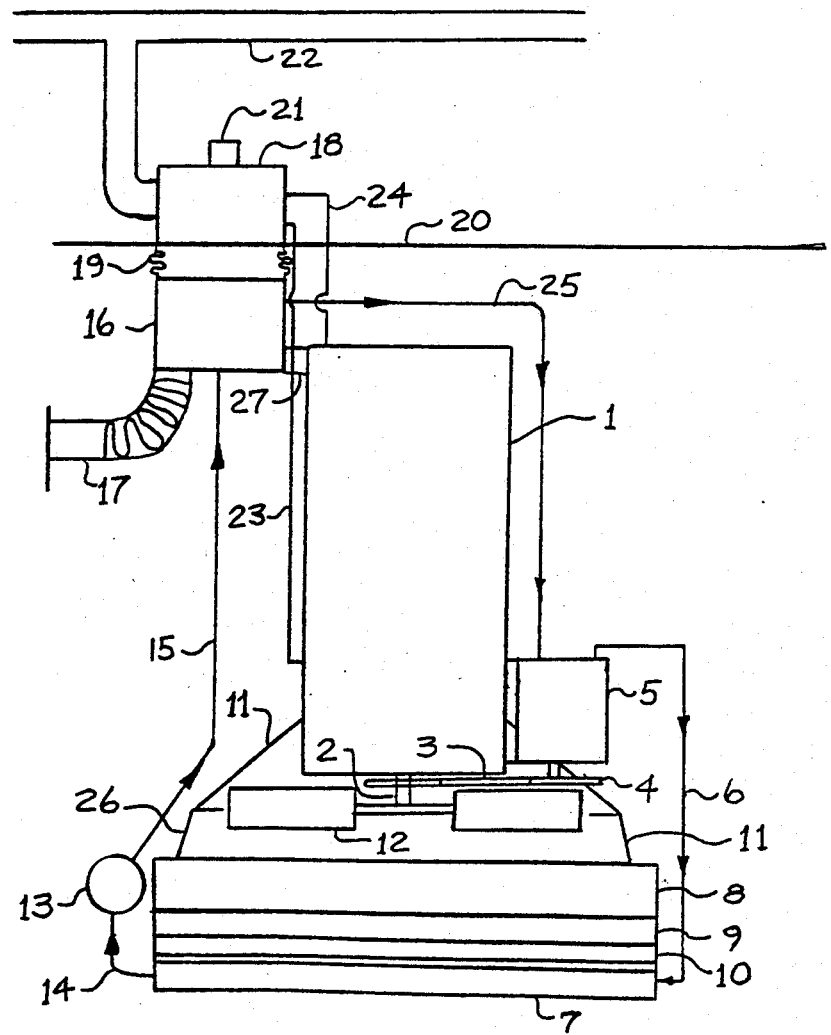
FIG. 1 is a schematic diagram of a modular air conditioning system in accordance with the invention mounted on an engine within a vehicle.

Referring to the drawing, the engine 1 is mounted in a conventional manner on the vehicle chassis and provides a supports for all of the components of the air conditioning system which comprise the refrigerant loop. The drive shaft 2 of the engine drives a belt 3 which in turn drives a pulley 4 on the compressor 5. It will be appreciated that the compressor 5 could be driven by an electric motor or a hydraulic motor either directly coupled or through a belt drive. The compressor 5 is mounted by conventional bracketry on the side of the engine and compresses refrigerant which is transmitted through refrigerant tubing 6 to the condensor 7. The engine cooling radiator 8, the engine charge air cooler 9, and the engine cooling shutter 10 are all mounted, to the extent present, together with the condensor 7 on a bracket assembly 11 to form a module which is supported by bracket assembly 11 on the engine 1. All of those components are conventionally cooled by the operation of a fan 12 which is driven by the engine accessory belt 3 which also drives the compressor 5. The fan could also be driven by an electric or hydraulic motor.

The air conditioning receiver-drier 13 is connected on its input side to the refrigerant tube 14 from the condensor 7 and is mounted on the side of the radiator 8 or other convenient location. The air conditioning receiver-drier 13 output is connected through the refrigerant tube 15 to the evaporator 16 which is mounted by bracket 27 to the rear portion of the engine. The return refrigerant tube 25 from the evaporator returns refrigerant to the compressor. Because all of the refrigerant lines and components are mounted on the engine, rigid tubes may be used as opposed to the flexible tubes necessary to accommodate engine movement in a conventional system wherein the evaporator is mounted on the vehicle dash panel.

A fresh air inlet flexible conduit 17 provides fresh air from outside the engine compartment for the air conditioner and also the heater 18. The fresh air side of evaporator 16 is connected to the heater 18 through a flexible conduit 19. The heater 18 is mounted on the vehicle dash panel or fire wall 20. The heater 18 includes a blower 21 which operates with the heater, as well as with the evaporator 16 when air conditioning, to blow air through ductwork 22 into the passenger compartment in the vehicle. The heater 18 is conventionally connected to the engine cooling system through the heater hoses 23 and 24.

Conventional controls are provided for selective operation of the heater 18 and the evaporator 16 for providing air conditioning. The engine and modular air conditioning system and heater operate in the following described manner. The engine 1 when running, operates and rotates the driveshaft 2 which drives the fan 12 for cooling of the engine. The fan draws air through the air conditioning condensor 7, the engine charge air cooler and the radiator 8. The shroud 26 directs the air back around the engine. The shutter 10 can be operated to control the amount of air flowing through the radiator when the engine is in operation. This controls the cooling of the engine as well as the charge air and the condensor.

The accessory group on the engine such as the generator, hydraulic pump for power steering, and the compressor 5, are driven by the belt 3. The compressor 5 can be conventionally selectively connected for driving through an electro-magnetic clutch controlled from the operator station. The compressor compresses fluid which is transmitted to the condensor 10. The condensor 10 is connected to the receiver-drier 13 which supplies refrigerant to a conventional expansion valve in the evaporator 16. The evaporator cools the fresh air flowing through conduit 17 and supplies it through flexible conduit 19 through the heater 18 to the heating and cooling passages 22 as it flows into the passenger compartment. The fresh air conduits 19 and 17 are flexible to accommodate the movement of the engine on its mounts within the engine compartment as well as to absorb engine vibrations and prevent their transmission to the dash panel 20. The heating and cooling of the passenger compartment is selectively controlled through controls in the operator station for selective operation of the heater or the air conditioning system.

In the assembly of a vehicle having an air conditioning system, all of the refrigerant containing components, i.e., the compressor 5, the condensor 7, the receiver drier 13, and evaporator 16 are assembled and mounted on the engine 1 together with refrigerant tubes 6, 14, 15, and 25 to form the complete refrigerant loop and thus a functional air conditioning system. The engine with the assembled air conditioning system are placed in a test cell, and the air conditioning system is checked for leaks and is charged. The functional performance of the air conditioning system may then be tested by actually operating the engine and the air conditioning system with suitable controls and sensors provided in the test cell or by operating the compressor only by an external power source, such a cell associated drive belt. If the system has a problem, suitable repairs can be made while in the test cell and with the components easily accessible.

Following testing and necessary repairs, the engine and air conditioning system (and cooling system) are delivered to the assembly line and installed as a unit into the vehicle by mounting the engine conventionally and connecting the fresh air conduits 17 and 19 to the evaporator 16.

The embodiments of the invention in which an exclusive property or privilege is claimed are defined as follows:

1. In a vehicle comprising an engine, an engine cooling system supported by the engine and including an engine fan disposed forwardly of said engine and a radiator disposed forwardly of said engine fan, a vehicle dash panel, and a vehicle heated mounted on said dash panel for operating in conjunction with heating a passenger compartment of the vehicle including a blower mounted in said heated, the improvement comprising a modular air conditioning system mounted entirely on said engine comprising discrete components including a compressor mounted on said engine, an air conditioning condenser mounted on said engine forwardly of said radiator for receiving condensing refrigerant, said engine fan providing cooling air sequentially to said condenser and to said radiator, and an evaporator mounted on said engine adjacent the rear end thereof, and a flexible conduit means connecting said evaporator to said blower for selective operation of said blower and said air conditioning for cooling said compartment.

2. The invention as set forth in claim 1 including a flexible inlet duct for supplying fresh air to said evaporator and said blower.

3. The invention as set forth in claim 1 including rigid refrigerant tubes connected between said evaporator, condensor and said compressor.

4. The invention as set forth in claim 1 including a receiver-drier mounted to said engine for connection between said condensor and said evaporator.

5. In combination with a vehicle engine, an engine cooling system supported by the engine and including an engine fan disposed forwardly of said engine and a radiator disposed forwardly of said engine fan, the improvement comprising a modular air conditioning system mounted entirely on said engine comprising discrete components including a compressor mounted on said engine, an air conditioning condenser mounted on said engine forwardly of said radiator for receiving condensing refrigerant, said engine fan providing cooling air sequentially to said condenser and to said radiator, and an evaporator mounted on said engine adjacent the rear end thereof.

* * * * *